(12) United States Patent
Belady et al.

(10) Patent No.: US 8,490,103 B1
(45) Date of Patent: Jul. 16, 2013

(54) ALLOCATING COMPUTER PROCESSES TO PROCESSOR CORES AS A FUNCTION OF PROCESS UTILIZATIONS

(75) Inventors: Christian L. Belady, McKinney, TX (US); Thomas L. Vaden, Neshanic Station, NJ (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1617 days.

(21) Appl. No.: 11/742,553

(22) Filed: Apr. 30, 2007

(51) Int. Cl.
*G06F 9/46* (2006.01)
*G06F 1/00* (2006.01)

(52) U.S. Cl.
USPC ............ 718/104; 718/102; 713/300; 713/323

(58) Field of Classification Search
USPC ............................................. 718/104
See application file for complete search history.

(56) References Cited

U.S. PATENT DOCUMENTS

| | | | | |
|---|---|---|---|---|
| 6,141,762 A * | 10/2000 | Nicol et al. | | 713/300 |
| 6,795,928 B2 * | 9/2004 | Bradley et al. | | 713/320 |
| 6,901,522 B2 * | 5/2005 | Buch | | 713/320 |
| 7,093,147 B2 * | 8/2006 | Farkas et al. | | 713/320 |
| 7,111,177 B1 * | 9/2006 | Chauvel et al. | | 713/300 |
| 7,308,591 B2 * | 12/2007 | Dubinsky | | 713/324 |
| 7,318,164 B2 * | 1/2008 | Rawson, III | | 713/320 |
| 7,412,353 B2 * | 8/2008 | Borkar et al. | | 702/186 |
| 7,617,360 B2 * | 11/2009 | Arai et al. | | 711/114 |
| 7,739,527 B2 * | 6/2010 | Rothman et al. | | 713/320 |
| 7,774,590 B2 * | 8/2010 | Borkar et al. | | 713/100 |
| 7,788,670 B2 * | 8/2010 | Bodas et al. | | 718/105 |
| 2003/0055969 A1 * | 3/2003 | Begun et al. | | 709/226 |
| 2003/0056126 A1 * | 3/2003 | O'Connor et al. | | 713/300 |
| 2003/0115495 A1 * | 6/2003 | Rawson, III | | 713/324 |
| 2004/0215987 A1 * | 10/2004 | Farkas et al. | | 713/300 |
| 2004/0267932 A1 | 12/2004 | Voellm | | |
| 2005/0149940 A1 * | 7/2005 | Calinescu et al. | | 718/104 |
| 2005/0155032 A1 * | 7/2005 | Schantz | | 718/100 |
| 2005/0210469 A1 | 9/2005 | Chung | | |
| 2005/0210470 A1 | 9/2005 | Chung | | |
| 2006/0080268 A1 | 4/2006 | Afeyan | | |
| 2006/0090161 A1 * | 4/2006 | Bodas et al. | | 718/100 |
| 2006/0095913 A1 * | 5/2006 | Bodas et al. | | 718/100 |
| 2006/0184287 A1 * | 8/2006 | Belady et al. | | 700/291 |
| 2006/0218557 A1 * | 9/2006 | Garthwaite et al. | | 718/105 |
| 2006/0294401 A1 * | 12/2006 | Munger | | 713/300 |
| 2007/0033425 A1 * | 2/2007 | Clark | | 713/320 |
| 2007/0061433 A1 * | 3/2007 | Reynolds et al. | | 709/223 |
| 2007/0074011 A1 * | 3/2007 | Borkar et al. | | 712/227 |
| 2007/0226482 A1 * | 9/2007 | Borkar et al. | | 713/100 |
| 2007/0288728 A1 * | 12/2007 | Tene et al. | | 712/227 |
| 2008/0301474 A1 * | 12/2008 | Bussa et al. | | 713/300 |
| 2009/0049443 A1 * | 2/2009 | Powers et al. | | 718/100 |
| 2009/0187777 A1 * | 7/2009 | Clark | | 713/320 |

* cited by examiner

*Primary Examiner* — Jennifer To

(57) ABSTRACT

Computer processes are allocated among cores of a multi-core multi-processor system at least in part as a function of utilization histories of the processes.

14 Claims, 1 Drawing Sheet

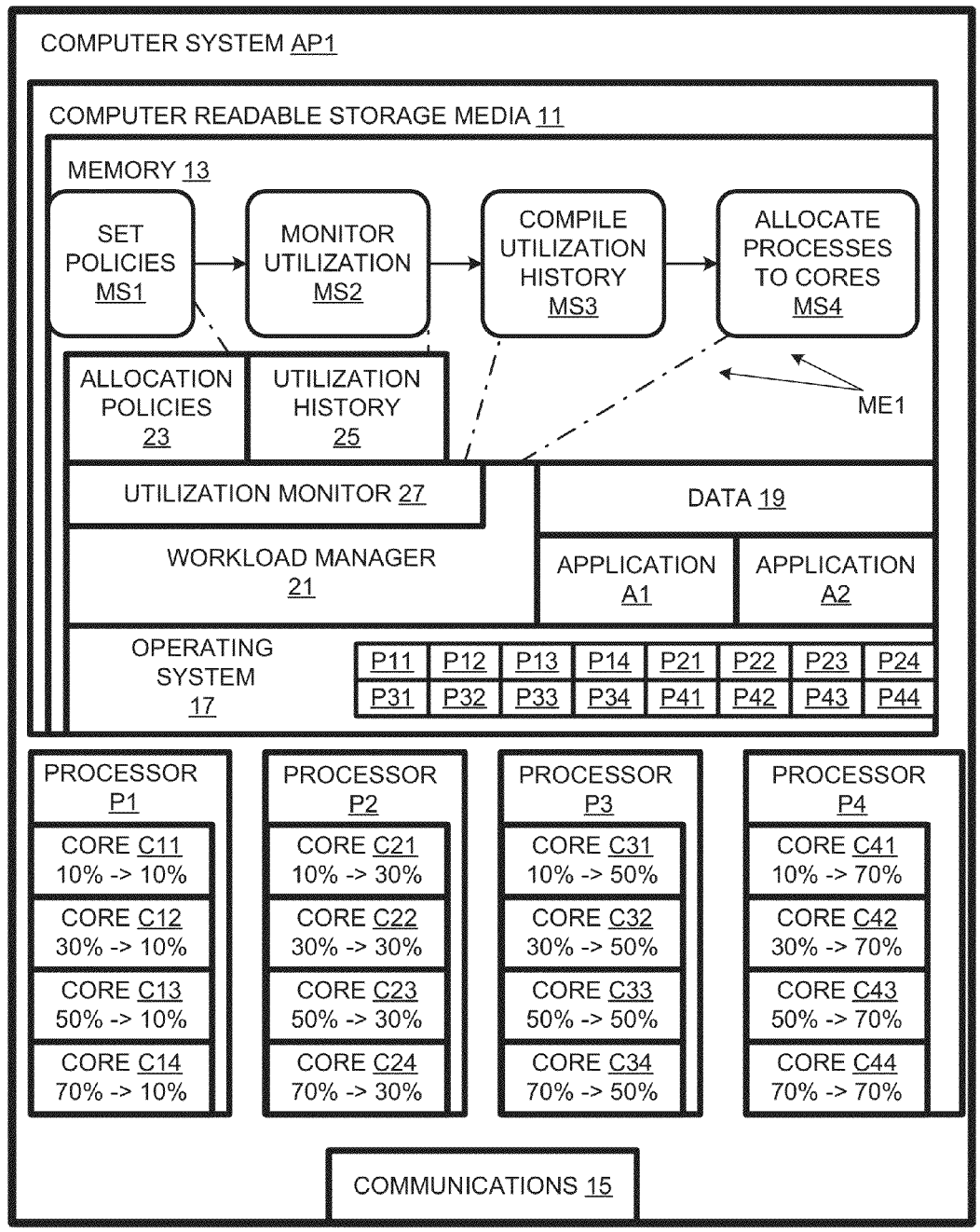

ALLOCATING COMPUTER PROCESSES TO PROCESSOR CORES AS A FUNCTION OF PROCESS UTILIZATIONS

BACKGROUND

An ever-increasing demand for computer performance has led to faster processors and greater levels of parallelism. High-end computers now boast multiple processors, each with multiple cores. This parallelism allows multiple processes to run in parallel on respective cores of the same or different processors. To maximize performance, processes should be divided among cores and processors as evenly as possible.

However, power consumption is an increasing concern for modern processors. Power consumption can be reduced by packing processes onto as few processors as possible so that some processors can be shut down or put in a low-power state. Taking this approach to the extreme can leave little headroom in a processor when processing needs suddenly increase; in such cases, the result can be a performance hit.

Some modern processors, e.g., the Xeon processor available from Intel Corporation and the Opteron processor available from Advanced Micro Devices, Inc., have reduced performance states that conserve power, providing the option of reducing power consumption while still making computer cycles available for processing. In some such processors, the lower power states must be shared by all cores on a processor, although different processors in a multi-processor system can assume different power states. The challenge is to find an allocation of processes to cores that provides a favorable tradeoff between power and performance given that what constitutes a favorable tradeoff can depend on the processes involved.

Herein, related art is described to facilitate understanding of the invention. Related art labeled "prior art" is admitted prior art; related art not labeled "prior art" is not admitted prior art.

BRIEF DESCRIPTION OF THE DRAWING

The FIGURE depicts implementations/embodiments of the invention and not the invention itself.

FIG. 1 is a combination schematic illustration and flow chart of a computer system and method in accordance with the present invention.

DETAILED DESCRIPTION

A computer system AP1 includes processors P1-P4, computer-readable storage media 11 including memory 13, and communications devices 15 (including network interface cards and host-bus adapters for storage array networks). Memory 13 stores an operating system 17, applications A1 and A2, data 19, a workload manager 21. Workload manager 21 allocates processes P11-P44 among processor cores C11-C44 in accordance with allocation policies 23. Allocation policies 23 call for processes P11-P44 to be allocated among cores C11-C44 in part as a function of expected utilizations derived from a utilization history 25 compiled by a utilization monitor of workload manager 21.

Computer system AP1 implements a method ME1, which begins with setting allocation policies at method segment MS1. The invention provides for static policies (e.g., that assign processes to cores without regard to monitored data) and dynamic policies (e.g., those based on utilization measurements). Policies can be based on measured utilization, expected utilization, and other factors (e.g., priority of workloads). Policies can seek to maximize performance, minimize power consumption, or provide various tradeoffs between these factors. One such tradeoff could be to minimize power consumption given that performance is to be within 90% of maximum. Workload manager 21 provides a user interface so that a system administrator can specify allocation policies. Any of these could be used as a default policy pending a selection by an administrator.

While applications A1 and A2 are running, utilization monitor 27 monitors utilization of each running process at method segment MS2. At the time represented in FIG. 1, sixteen processes P11-P44 are running. Some of these are associated with each of operating system 17, application A1, application A2, workload manager 21, and utilization monitor 27. Utilization monitor 27 compiles the utilization data in utilization history 25 at method segment MS3. This compilation allows utilization averages, patterns, and trends to be recognized by workload manager 21.

Workload manager 21 allocates processes P11-P44 to cores C11-C44 at method segment MS4. At a specific iteration of method segment MS4, reallocates processes P11-P44 to change a distribution of 10%-30%-50%-70% utilization on each processor to a distribution in which the utilization is the same or nearly same for all cores on each processor, while utilizations for respective processors P1, P2, P3, and P4 are 10%, 30%, 50%, and 70%. This arrangement allows processors P1, P2, and P3 to enter respective low power states without imposing significant penalties on performance.

This allocation scheme is applicable to processors that allow for low power performance states provided all cores of a processor "agree" to the lower state. In the pre-allocation 10%-30%-50%-70% utilization for the cores of one processor, the 70% utilization on one core prevents the other cores from entering a low-power state. Instead, any extra power available because one core is operating at low utilization is diverted to other cores to increase their execution frequency. In some cases, an optimal allocation can make use of this feature. However, if energy efficiency is a concern, it is generally better to try to match core utilization within a processor to allow a lower power state to be achieved since the only way to go to a lower power state is if all of the cores agree. Thus, for efficiency, allocations must try to achieve matching core utilizations within a processor.

For cases where the number of active processes is less than the number of cores, workload manager 21 can attempt to allocate processes so that some processors are unused, allowing them to enter latent low-power states for further power savings. The present invention provides for maximizing performance by distributing predicted utilization as evenly as possible, and for minimizing power consumption, by packing processes on as few processors as possible so that the unused processors can be put in low power (inactive) modes. The present invention also provides for distributed processes so that, among active processors, the variance of utilization among cores for each processor is less than the variance in utilization (averaged among all cores of each processor) among processors to provide a favorable tradeoff between power efficiency and performance.

A "computer" is a machine that manipulates data in accordance with instructions. A "program" is an ordered series of computer-executable instruction. As used herein, a "program" is inherently tangibly embodied in computer-readable media. A "server" is a computer that provides services to, e.g., serves web pages to or responds to database queries from, other computers.

"Computer-readable media" refers to media that can be accessed by a computer and includes volatile and nonvolatile, removable and non-removable media. By way of example, and not limitation, computer-readable media may comprise computer storage media and communication media. "Computer storage media" includes volatile and nonvolatile, removable and non-removable media implemented in any method or technology for storage of information such as computer-executable instructions, data structures, program modules or other data.

"Computer storage media" encompasses, but is not limited to, random access memory (RAM), read-only memory (ROM), Electrically-Erasable Programmable Read-Only Memory (EEPROM), flash memory or other memory technology, compact disc read-only memory (CDROM), digital versatile disks (DVD) or other optical disk storage, magnetic cassettes, magnetic tape, magnetic disk storage or other magnetic storage devices, or any other medium which can be used to store the desired information and which can be accessed by computer.

"Communication media" encompasses computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above should also be included within the scope of "computer-readable media".

Herein, "allocation" refers to an assignment of a process or set of processes to a computer processor core or set of processor cores. A process is a sequence of computer-executable instructions, these instructions being executed on the core to which the process is assigned and on which the process is "running". "Utilization", as used herein and applied to processors and processor cores refers to the fraction or percentage of processor or cycles doing real work. The percentages in FIG. 1, represent the percentages of core cycles productively used by respective processes. A "utilization history" is a compilation of utilization data collected over time. The utilization data also associates the power state or execution frequency with the utilization data or normalizes actual utilization to indicate what the utilization would have been if the processor were running at full speed.

In the computer system of FIG. 1, individual cores on a processor are treated as the grain of computing resource to associate with a process. HP-UX, an operating system available from Hewlett-Packard Company, provides for processor sets (psets). A pset is an arbitrary grouping of processor cores. For example, a first pset can consist of all the cores on a portion of the processors in a system, while a second pset contains all the cores on the remaining processors. Alternatively, a first pset could include the zeroth cores of all the processors in a system, a second pset could include the 1st and 2nd cores on all the processors, and a third pset could include all the 3rd cores. Power policy settings can than manipulated for applications as a specific grouping of cores in each pset and/or the power attributes of the cores in those psets. Instead of only associating processes with a particular processor core at a given performance/power setting, we could alternatively associate the processes with a particularly attributed processor set to execute the policy setting.

Policies can vary according to the relative importance of power and performance, which in turn can vary per workload. For example, for application A1, performance may be paramount, while for application A2 performance is less critical and power savings are therefore a bigger factor in allocation. In such a case, processes associated with application A1 can be allocated to processors P1 and P2 so that distribution is divided as evenly as possible between these processors, while processes associated with application A2 are packed onto processor P3 along with non-application processes, so that processor P4 can be put in an idle state. These and other variations upon and modifications to the illustrated embodiment are provided by the present invention, the scope of which is defined by the following claims.

What is claimed is:

1. A computer system comprising:
an operating system instance;
plural multi-core processors, each of said multi-core processors being an integrated circuit with plural processor cores, each of said cores being configured to execute processes assigned by said operating system instance;
a utilization monitor to track respective per-core utilizations of said processor cores by computer processes and to compile a utilization history;
allocation policies to generate a plan specifying how processes are to be allocated to said processor cores at least in part as a function of said utilization history; and
a workload manager to implement said plan, wherein said workload manger allocates said processes to processor cores so that the processes with highest expected per-core utilizations are allocated to respective cores on a first processor while processes with lowest expected per-core utilizations are allocated to respective processor cores on a second processor which is set at a lower-power active state than is said first processor.

2. The computer system as recited in claim 1 wherein said workload manager further allocates said processes to said processor cores so that expected average per-core utilization is distributed as evenly as possible among said processors.

3. The computer system as recited in claim 1 wherein said second processor is set to an idle state while said processes with highest expected per-core utilizations are allocated to respective cores on said first processor.

4. The computer system as recited in claim 1 wherein a maximum variance of expected per-core utilization among same-processor cores among all processors is less than a variance of average per-core utilization across processors.

5. The computer system as recited in claim 1, wherein, for any of said plural processors, if any of said plural processors, if one of its processor cores enters a lower power state, all of its processor cores must enter that power state.

6. A method comprising:
tracking per-core utilization of processor cores by computer processes for plural multi-core processors concurrently executing processes of the same operating system instance, each of said multi-core processors being an integrated circuit with plural processor cores;
compiling a utilization history for said processes; and
allocating said computer processes to said processor cores as a function of said utilization history and allocation policies, and wherein after said allocating a maximum variance of expected per-core utilization among processor cores of the same processor among all processors is less than a variance of average per-core utilization across processors.

7. The method as recited in claim 6 wherein said allocation policies call for maximizing performance irrespective of power consumption, said computer processes being allocated to processor cores so that expected per-core utilization is distributed as evenly as possible among said processors.

8. The method as recited in claim 6 wherein said allocation policies call for packing processes on processors so that at least a first processor of said processors can enter a lower-power state while another processor of said processors operates in a higher-power state.

9. The method as recited in claim 8 wherein said lower-power state is an idle state.

10. The method as recited in claim 9 wherein said lower-power state provides for executing computer processes.

11. A computer product comprising non-transitory computer-readable media encoded with a program of computer-executable instructions configured for, when executed by a processor:
    tracking per-core utilization of processor cores by computer processes for plural multi-core processors executing processes of the same operating system instance;
    compiling a utilization history for said processes; and
    allocating said processes to said processor cores as a function of said utilization history and allocation policies, wherein said program is further configured to allocate said processes so that a maximum variance of expected per-core utilization among same processor cores among all processors is less than a variance of average per-core utilization across processors.

12. The computer product as recited in claim 11 wherein said allocation policies call for maximizing performance irrespective of power consumption, said processes being allocated to processor cores so that expected per-core utilization is distributed as evenly as possible among said processors.

13. The computer product as recited in claim 11 wherein said allocation policies call for packing processes on processors so that at least a first processor of said processors can enter a lower-power state while another processor of said processors operates in a higher-power state.

14. The computer product as recited in claim 13 wherein said lower-power state is an idle state.

\* \* \* \* \*